United States Patent [19]

Jo et al.

[11] 4,391,875

[45] Jul. 5, 1983

[54] ASBESTOS PRODUCTS OF IMPROVED PHYSICAL PROPERTIES HAVING METAL OXIDES ON THE SURFACES THEREOF

[75] Inventors: Byeong H. Jo, Horsham, Pa.; Jerry Zucker, Charleston, S.C.

[73] Assignee: RM Industrial Products Company, Inc., North Charleston, S.C.

[21] Appl. No.: 215,508

[22] Filed: Dec. 11, 1980

[51] Int. Cl.³ .................. C03B 37/00; C04B 43/04; D21H 3/66; D21H 5/18

[52] U.S. Cl. ............................ 428/378; 162/3; 162/153; 264/178 R; 264/181; 264/183; 427/180; 428/443; 428/453; 427/218; 427/343

[58] Field of Search ................. 427/180, 218, 343; 428/378, 443, 543; 162/3, 153; 264/178 R, 181, 183

[56] References Cited

U.S. PATENT DOCUMENTS

| | | |
|---|---|---|
| 1,982,542 | 11/1934 | Seigle . |
| 2,101,449 | 12/1937 | Parry ................................ 428/378 |
| 2,406,779 | 9/1946 | Kurlychek . |
| 2,460,734 | 2/1949 | Callinan . |
| 2,626,213 | 1/1953 | Novak . |
| 3,806,572 | 4/1974 | Trainor et al. . |
| 4,171,405 | 10/1979 | Pezzoli ............................ 428/378 |
| 4,234,377 | 11/1980 | Pezzoli ............................ 428/378 |
| 4,309,477 | 1/1982 | Pezzoli ............................ 428/378 |

OTHER PUBLICATIONS

Allen, Colour Chemistry, Thomas Nelson and Sons Ltd., London, 1971, p. 241 and 244.

*Primary Examiner*—James C. Cannon
*Attorney, Agent, or Firm*—Gary, Juettner & Pyle

[57] ABSTRACT

The abrasion resistance and tensile strength of asbestos is significantly improved by the addition of significant amounts of metal oxides, such as iron oxide, under conditions to provide at least some surface bonding of the oxides to the surface of the asbestos. The oxides are preferably added during formation of bodies from asbestos dispersions and also impart color to the final product.

10 Claims, No Drawings

ASBESTOS PRODUCTS OF IMPROVED PHYSICAL PROPERTIES HAVING METAL OXIDES ON THE SURFACES THEREOF

BACKGROUND OF THE INVENTION

The invention relates to asbestos products having improved physical properties and more particularly to asbestos that has been treated with a metal oxide. The process described herein is particularly suitable in connection with a procedure wherein the asbestos is dispersed in water, and the dispersion is later coagulated to form a solid body.

Methods for making asbestos products from dispersions are well known and are described in the following U.S. Pat. Nos. 2,972,221; 3,630,012; 3,738,805; 2,626,213; 3,676,038; 3,338,994; and 3,806,572.

In U.S. Pat. No. 3,806,572, for example, a method is described wherein a liquid asbestos dispersion is passed through nozzles into a coagulating bath to form a yarn, and the yarn is collected by pot spinning. The raw asbestos is first dispersed in the form of an aqueous colloid with the addition of a suitable dispersant. A particularly suitable dispersant is a surfactant, such as a fatty acid soap. The asbestos and soap solution are then mixed together to form a viscous dispersion having an asbestos content in the order of from about 0.5 to about 10 percent.

The dispersion is then fed through a plurality of nozzles into a bath containing a coagulant for the dispersant, which typically comprise bi- or trivalent soluble salts of a metal. The strands are then drawn away and ultimately fed into pot spinning device. The yarn thus produced is then cleaned and may be formed into a variety of forms, such as textiles, ropes and the like.

Asbestos products produced from a dispersion process are generally superior to products made by conventional methods, such as carding and spinning of the crude fiber. It would be desirable, however, to further improve the properties of asbestos products, especially abrasion resistance and tensile strength.

SUMMARY OF THE INVENTION

It has been found unexpectedly that intimate surface treatment of asbestos with iron or chromium oxide very significantly improves the physical properties of the final product. The oxide is preferably incorporated into the asbestos when the asbestos is dispersed in water, in order to achieve maximum surface contact between the oxide and the opened floor bundles. The asbestos is otherwise processed in accordance with conventional procedures to produce a solid body containing the oxide. It is believed that the improved properties are related to a weak chemical reaction or intermolecular hydrogen bonding between the iron oxide and available chemical sites on the surface of the asbestos fiber.

DESCRIPTION OF THE PREFERRED EMBODIMENT

In accordance with the present invention, asbestos fibers are given a surface treatment with iron or chromium oxide, or mixtures thereof, preferably under conditions to obtain maximum surface contact between the fiber and the oxide. Treatment is preferably carried out in an aqueous or other liquid medium, whereby the metal oxide, in the form of a highly divided powder or solution, is deposited on the surface of the asbestos fiber.

Asbestos is a fibrous mineral that occurs in veins scattered throughout rock masses deep in the earth. The variety of asbestos known as chrysotile, essentially hydrous magnesium silicate, occurs in the form of fiber bundles that may be opened up, either mechanically or chemically, into individual fibers. Such fibers, in turn, may be formed into a variety of products.

Preferably, chrysotile asbestos is employed in connection with the present invention, and the macro fiber bundles are reduced to a minimum possible diameter prior to the treatment with the oxide, either by mechanical processing such as carding, or by chemical treatment.

In connection with the present invention, the asbestos fibers are preferably opened chemically by forming a slurry or dispersion thereof in water, preferably with the addition of a dispersant, such as a surface active agent. Methods for forming aqueous asbestos dispersions are well known and are described in detail in U.S. Pat. Nos. 2,626,213 and 2,652,325. Crude asbestos fibers are mixed with water and a surface active agent and then agitated until a smooth viscous consistency is obtained. A particularly suitable surfactant is a fatty acid soap added in the amount of from about 15 to about 30 percent by weight, with a total fiber content in the dispersion of from about 0.5 to about 10 percent.

Either prior to, during, or after the formation of the asbestos dispersion, a quantity of metal oxide or other suitable pigment is added to the system. The most suitable additives are iron oxide or chromium oxide in very finely divided form, which when agitated with the asbestos dispersion, become uniformly dispersed therein. Any of the various ferrous or ferric oxides and chromium oxides are suitable, although certain of these oxides result in the most desirable pigmentation of the final product. For example, chromium sesquioxide ($Cr_2O_3$) produces a green pigmentation in the final product. Various types of iron oxides, eg., $Fe_2O_3$, $Fe_3O_4$ and $Fe_2O_3$. FeO, cause pigmentation such as yellow, gold, red and brown.

As a non-fully equivalent alternative, various of the ultramarines may be used to produce pigmentation in the product, for example, ultramarine blue, or ultramarine green, red and yellow.

The amount of oxides or pigments added to the dispersion are preferably in the order of from about 5 to about 30 percent by weight of the asbestos fiber. The oxides, it will be noted, are temperature resistant and are not soluble in the dispersion or in the solvents which may be used to clean the asbestos after the dispersion has been coagulated.

The asbestos dispersion, having the metal oxide or pigment dispersed therein, may then be processed in several different ways to produce a variety of types of products. One acceptable procedure is to remove the water from the dispersion and dry the resulting product with a method similar to that used in making paper. Another procedure involves depositing the dispersion on a substrate, followed by drying.

Most preferably, however, a suitable coagulant is added to the dispersion, which causes coagulation or precipitation of the dispersant into a water insoluble form. This, in turn, causes the asbestos fibers to come out of the dispersion with the metal oxide being uniformly deposited on the surface of the fibers.

The asbestos and metal oxide dispersion may be employed, for example, in a coagulation process wherein the dispersion is converted into ribbons or yarn in a continuous fashion by passing the dispersion through one or more orifices into a coagulating bath. The coagulating bath, as mentioned hereinbefore, contains a coagulant for the dispersant. If, for example, the dispersant is a fatty acid soap, the coagulant may be aluminum, calcium or zinc chloride or another water soluble salt that reacts with the soap to form a water insoluble product.

An especially suitable procedure for producing yarn from the dispersion of the present invention is described in U.S. Pat. No. 3,806,572, incorporated herein by reference. A plurality of stationary nozzles fed with the dispersion are disposed in a coagulating bath to form a plurality of individual strands. The strands are continuously pulled through the coagulating bath away from the nozzles and are then combined, removed from the bath and passed through a zone of low tension wherein the final stages of coagulation can take place. The combined strands may then be withdrawn as a single and under tension, for example by pot spinning, to produce a yarn package. The residual precipitated soap is then preferably removed by washing with an organic solvent. The yarn may then be processed by conventional methods to produce a variety of types of fabrics.

Due to the nature of the dispersion process, it will be noted that the metal oxide particles become deposited on, or otherwise intimately associated with, the asbestos, such that the oxide is very uniformly distributed in the final asbestos body. It is believed that at least some of the metal oxide becomes chemically bound by formation of a covalent bond or atomic displacement with respect to reactive sites on the fiber, although the exact mechanism is not clearly understood.

When processed as aforesaid, the treated asbestos of the present invention has superior physical properties to asbestos that is untreated but otherwise identically processed. For example, the abrasion resistance of cloth made from oxide treated asbestos is at least twice as great as identical cloth made from untreated asbestos, and the tensile strength is improved by 10 and 20 percent. The product also is uniformly pigmented with various colors as may be desired.

We claim:

1. An improved asbestos product, said product consisting essentially of asbestos fiber and a metal oxide coated on said fiber and in surface contact therewith, said metal oxide being selected from the group consisting of iron oxide and chromium oxide.

2. The product of claim 1 wherein the fiber is coated with from about 5 to about 30 percent by weight with the metal oxide.

3. Codispersed asbestos fibers and metal oxide particles, said metal oxide being selected from the group consisting of iron oxide and chromium oxide.

4. The product of claim 3 wherein the codispersion contains an aqueous solution of a surfactant.

5. A method of improving the properties of products made from asbestos comprising the steps of dividing the asbestos into fibers, and providing a coating of a metal oxide directly onto the surface of said fibers, said metal oxide being selected from the group consisting of chromium oxide and iron oxide.

6. A method of improving the properties of asbestos products comprising the steps of forming an asbestos dispersion containing a water insoluble pigment selected from the group consisting of chromium oxide, iron oxide and ultramarines, and then coagulating the dispersion to form a solid.

7. The method of claim 6 wherein the dispersion is formed by agitating the asbestos and metal oxide in water containing a surfactant.

8. The method of claim 7 wherein the dispersion is coagulated by rendering the surfactant insoluble in water.

9. The method of claim 6 wherein the solid contains from about 5 to about 30 percent metal oxide, based on the weight of the asbestos.

10. The method of claim 6 wherein the dispersion is passed through an orifice disposed in a coagulating bath to produce a shaped solid.

* * * * *